(12) United States Patent
Holland (10) Patent No.: US 7,314,109 B2
(45) Date of Patent: Jan. 1, 2008

(54) ELECTRIC BICYCLE

(76) Inventor: Ronald A. Holland, 1312 Cambridge La., Newport Beach, CA (US) 92660

(*) Notice: Subject to any disclaimer, the term of this patent is extended or adjusted under 35 U.S.C. 154(b) by 0 days.

(21) Appl. No.: 10/691,951

(22) Filed: Oct. 23, 2003

(65) Prior Publication Data

US 2005/0087379 A1    Apr. 28, 2005

(51) Int. Cl.
*B60K 1/00*    (2006.01)
*B62K 11/00*    (2006.01)
*B62M 23/02*    (2006.01)

(52) U.S. Cl. .................... 180/205; 180/65.1; 180/220
(58) Field of Classification Search ............. 180/65.1, 180/65.5, 205–207, 220
See application file for complete search history.

(56) References Cited

U.S. PATENT DOCUMENTS

| | | | | |
|---|---|---|---|---|
| 4,085,814 A | * | 4/1978 | Davidson et al. | 180/206 |
| 4,280,581 A | * | 7/1981 | Rudwick | 180/207 |
| 4,541,500 A | * | 9/1985 | Gelhard | 180/205 |
| 4,770,433 A | * | 9/1988 | Hartmann | 280/260 |
| 5,024,286 A | * | 6/1991 | Lean et al. | 180/206 |
| 5,347,682 A | * | 9/1994 | Edgerton, Jr. | 16/34 |
| 5,361,863 A | * | 11/1994 | Goodwin | 180/205 |
| 5,799,747 A | * | 9/1998 | Olsen | 180/221 |
| 6,062,329 A | * | 5/2000 | Chai | 180/205 |
| 6,131,683 A | * | 10/2000 | Wada | 180/220 |
| 6,144,125 A | * | 11/2000 | Birkestrand et al. | 310/68 B |
| 6,157,149 A | * | 12/2000 | Ohnuma | 318/139 |
| 6,272,941 B1 | * | 8/2001 | Phillips | 74/413 |
| 6,305,485 B1 | * | 10/2001 | Kwan | 180/221 |
| 6,320,336 B1 | * | 11/2001 | Eguchi | 318/139 |
| RE37,583 E | * | 3/2002 | Mayer et al. | 180/220 |
| 6,446,745 B1 | * | 9/2002 | Lee et al. | 180/206 |

* cited by examiner

*Primary Examiner*—Lesley D. Morris
*Assistant Examiner*—Marc A. Scharich
(74) *Attorney, Agent, or Firm*—Kenneth Green; Edgar W. Averill, Jr.

(57) ABSTRACT

An electrically powered bicycle includes a hub motor, which is mounted to the bicycle frame by its axle. A drive sprocket mounted to the outer case of motor is engaged by a chain to the sprocket on a multi-speed hub on the rear wheel, so that when the motor turns, it drives the wheel. A freewheel, also mounted to the outer case of motor, is engaged by a chain to the large sprocket on the pedal crank, such that when the motor is operating, it does not turn the pedal sprocket. When the pedals and the motor are both operating and the sprocket on the freewheel is rotated as fast as the motor, the pedals can drive the motor, and consequently, the bicycle. An additional driven sprocket is mounted to the motor case and an additional freewheel is mounted to the multi-speed hub, and both are connected by a third chain so that when the bicycle is coasting (i.e., the motor is not driving the rear wheel), the rear wheel will drive the motor to provide downhill, regenerative braking capability.

20 Claims, 7 Drawing Sheets

ELECTRIC BICYCLE

FIELD OF INVENTION

The present invention relates in general to electric powered bicycles, and more particularly to new, improved technology for electric powered bicycles that provides, among other things, steeper and more efficient hill climbing ability, longer range, and a smother ride than the prior art, plus downhill regenerative braking.

BACKGROUND OF THE INVENTION

Prior art electric drives for bicycles can be divided into the following four basic types:
(1) Friction drive on the tire;
(2) Drives through the pedal shaft to the rear wheel;
(3) Direct drives to the rear wheel; and
(4) Wheel hub motors.

The cheapest and simplest type of electric drive for a bicycle is a friction drive on the front or rear tire. This method is so inefficient that it is almost impractical. However this type will probably continue to be built and sold, because they can be easily installed on an existing bicycle as a kit. U.S. Pat. No. 6,065,557 to von Keyserling, U.S. Pat. No. 5,316,101 to Gannon, and U.S. Pat. No. 3,961,678 to Hirano contain examples of this type of drive.

State of the art drives through the pedal shaft to the rear wheel are usually heavy, bulky gearboxes with electric motors attached and a pedal shaft protruding on each side. The advantage of this type of drive is that the rear wheel is driven through the normal pedal chain by the pedals and the motor, or by the pedals alone. Therefore, a normal multi-speed bicycle rear drive can be used to improve hill climbing ability and efficiency. There are a few versions that allow the motor to drive the rear wheel without turning the pedals, but they require additional mechanisms, which increase the cost.

A disadvantage of this type of drive is that the pedal shaft turns at about one third of the speed of the rear wheel in high gear; therefore, the rotational speed of the motor must be reduced about three times further when driving through the pedal shaft, than when driving the wheel directly. And then, as the power from the motor is transmitted on through the pedal shaft to the rear wheel it has to be sped up again, to about three times the pedal shaft speed. Both the additional reduction and the subsequent up-speed add to the friction losses and cause a significant loss in overall efficiency.

Electric bicycles must carry a large amount of battery weight to have an effective range, and for safety and maneuverability it is very important to keep that weight low and toward the center of the bicycle. Therefore, another disadvantage of driving through the pedal shaft is that the bulky transmission and motor combination around the pedal shaft causes the battery to be relegated to a higher position, away from the center of the bicycle. U.S. Pat. No. 6,230,586 to Chang, U.S. Pat. No. 6,131,683 to Wada, and U.S. Pat. No. 6,015,021 to Sonobe each disclose a different configuration of a drive through the pedal shaft to the rear wheel.

Direct drives to the rear wheel take many different forms, but one disadvantage common to all of them is that they require another drive chain and sprocket, or belt and pulley to the rear wheel, in addition to the customary pedal chain and sprocket. Also, in order to pedal the bicycle efficiently when the motor is not in use, another ratcheting device (commonly called a "freewheel") is required between the extra sprocket or pulley and the rear wheel hub. U.S. Pat. Nos. 6,011,366 to Murakami, 5,937,964 to Mayer, and 5,433,284 to Chou are examples of direct drive to the rear wheel.

Wheel hub motors look similar to the normal bicycle hub having flanges with holes for spokes on each side and an axle through the center. However they are much larger in diameter, about six to ten inches, and much heavier, about ten to fifteen pounds. They are made for either front or rear wheel application, but when applied to the front wheel of a bicycle, they create a gyroscopic force that at high speed makes the bicycle hard to steer and dangerous in some conditions. When applied to either end of the bicycle, wheel hub motors increase the polar moment of inertia significantly in both the vertical and horizontal planes. It is well known by those skilled in the art of designing vehicles that this is a highly undesirable characteristic from a handling and safety point of view. When applied to the front of a bicycle with front suspension, the large increase in un-sprung weight renders the suspension practically ineffective, and the same is true at the rear. U.S. Pat. Nos. 6,286,616 to Kutter, 6,093,985 to Chen, and 6,015,021 to Tanaka teach different configurations of wheel hub motors.

At constant voltage, as the required torque increases, the speed and the efficiency of a direct current electric motor of the type used on electric bicycles decreases. Therefore, a bicycle with a single gear ratio electric drive is very inefficient when climbing a hill, because it must slow down to develop the required torque to overcome the hill. In moderately hilly terrain, this inefficiency can cut the range of the bicycle in half. The steeper the hill, the less efficient the motor becomes. On a long hill, this wasted energy usually heats up the motor enough to open the thermal protection switch and turn off the power before the bicycle reaches the top of the hill.

Common bicycle multi-speed drives, such as multi-speed hubs or rear derailleurs, drive the rear wheel through a freewheel device, so that the pedals do not turn while coasting. Therefore, any of the prior art bicycles that used this type of devices to increase the hill climbing ability of the motor do not have the ability to recharge the battery through the electrical generation capability of the motor while coasting downhill. In fact, there does not seem to be any evidence that there has ever been a bicycle with more than a single gear ratio electric drive that had the ability to drive the motor while coasting downhill. This ability is important to extending the range of the electric bicycle, because most electric motors have the ability to act as generators when connected to the correct circuitry.

Accordingly, the need exists for an electric powered bicycle that incorporates the following important features:

(1) A simple, inexpensive multi-speed rear wheel drive that can be driven efficiently by either the pedals or the motor independently or both in unison, without losing the ability to drive the motor as a generator for charging the batteries while pedaling or coasting downhill.

(2) A shifting device that can be used to shift the multi-speed drive to greater speed reductions as the bicycle begins to climb steeper hills. (When the hub shifts to larger reductions, the torque required from the motor to climb the hill is reduced and the efficiency increases.)

(3) A motor/drive unit and large battery container that can be fitted to an existing bicycle design in a position that is low and close to the center of the bicycle.

SUMMARY OF THE INVENTION

The simplest, most efficient way of accomplishing the intent of this invention is to use one of the newly developed, highly efficient, gear-less, brush-less, direct current, electric, rear hub motors, but not installed in the wheel as the manufacturer intended. Instead, the axle of the hub motor is mounted to brackets that are, in turn, mounted to the frame of the bicycle, just forward of the rear wheel. Because the motor is designed to turn at the speed of a bicycle wheel, a sprocket of about the same size as the sprocket on the multi-speed hub can be fixedly mounted to the rotatable outer case of the motor, beside the conventional freewheel, and concentric to the motor axle. A conventional bicycle chain can then be operatively connected around the two sprockets to drive the rear wheel. The difference in the size of the two sprockets must be adjusted to obtain the desired top speed of the bicycle, depending on the highest gear ratio of the multi-speed hub chosen.

Another conventional bicycle chain is operatively connected around the conventional large sprocket on the pedal shaft and the sprocket on the conventional freewheel, screwed onto the outer case of the motor in the conventional location. This arrangement provides the rider with the ability to drive the motor, and, in turn, the rear wheel by pedaling the bicycle. Since this type of motor offers almost no resistance to rotation when the power is turned off, this bicycle can be pedaled with almost the same ease as a non-electric bicycle with the same rear hub. Fitted with the appropriate circuitry, at the command of the rider, the motor can be pedaled forward to recharge the batteries. This adds only minimally to the effort of pedaling, and it is particularly convenient if the bicycle is on at least a slight downhill grade.

The first preferred embodiment of the invention additionally provides downhill regenerative braking. The two drive chains described above are preferably located on the right side of the bicycle, as conventional, which leaves the left side open for a forward drive from the rear wheel to the motor. This drive arrangement can be accomplished by fixedly connecting a sprocket to the left side of the outer case of the motor, like the one on the right side, screwing a freewheel onto the left side of the rear hub, and connecting a chain around the two sprockets. Thus, when the power to the motor is turned off and the bicycle is coasting downhill, the rear wheel drives the motor in the forward direction. Fitted with the correct circuitry and at the command of the rider, the motor, when driven at or above approximately half of its full speed, can recharge the batteries and provide braking assistance.

As is well known by those skilled in the art, the drive function performed by the chain and sprocket arrangement can alternatively be performed by other mechanisms, including gears, shafts, cables, belts and pulleys, cog belts and pulleys, and gear belts and pulleys.

As is well known by those skilled in the art, the conventional freewheel allows free rotation of the chain and sprocket in one direction, and provides a fixed connection to transfer driving force from the chain to the rotating member (in this instance, the outer case of the motor), when the chain travels in the other direction. As is also well known by those skilled in the art, the function performed by the conventional freewheel can alternatively be performed by a number of other unidirectional rotating devices, such as a clutch bearing fitted with a sprocket.

This first preferred embodiment also has, among others, the following advantages:

(1) Since the motor is brushless, and gearless, and turns at very low speed, about 260 RPM (the speed of the a 26" bicycle wheel traveling at 20 MPH), there is almost no friction loss when driving the motor forward, so most of the pedaling or braking energy is converted to electrical power.

(2) The multi-speed rear hub can be operated to keep both the motor and pedaling speed up even when the bicycle is moving slowly, which provides the necessary torque and efficiency when hill climbing.

(3) These electronically commutated motors are usually of the three phase synchronous type, which makes the circuitry for regenerative pedaling and braking simple, efficient, and inexpensive.

A second preferred embodiment of this invention is similar to the first preferred embodiment except that a jack-shaft is rotatably mounted, in place of the motor, in the motor mounting brackets. Then a smaller, slightly higher speed, brush-less, gear-less motor of the type used in the first preferred embodiment, or of the type that has a fixed case and a rotating shaft, is mounted beside the jack-shaft, preferably in the same brackets. The jack-shaft can then be driven at about the same speed as the large motor it replaced, through a small reduction drive from the smaller, higher speed motor. A freewheel is not be needed between the motor and the jack-shaft because the small reduction drive (under four to one ratio) would not cause appreciable frictional loss and the regenerative pedaling and braking would still be quite effective. Pedaling can be accomplished through a freewheel on the jack-shaft and a sprocket, fixed to the jack-shaft, would be operatively connected to the sprocket on the rear hub through a bicycle chain, thereby allowing the bicycle to be driven by the motor, through the jack-shaft, to the multi-speed rear hub without turning the pedals.

As is well known by those skilled in the art, a jack-shaft is an intermediate shaft which receives power through belts or gearing and transmits it to other driven rotating members.

The second preferred embodiment with the jack-shaft can also be fitted with the downhill regenerative braking. This would be accomplished by screwing a freewheel onto the left side of the rear hub, fixedly attaching a sprocket to the jack-shaft, and operatively connecting a bicycle chain around the two sprockets.

A third preferred embodiment of this invention is the same as the first preferred embodiment except that the rear hub motor is of the type that contains a high-speed brush motor, a reduction gear assembly (with a ratio of about ten to one or above), and a freewheeling device inside the hub. The freewheeling device inside the hub allows freewheel coasting and ease of pedaling when the motor is not running.

A fourth preferred embodiment of this invention is the same as the third preferred embodiment with the jack-shaft, except that the motor is of the small, high speed, either brush or brush-less type. Because of the large amount of reduction required between the motor and the jack-shaft, a freewheel is used in the reduction drive, preferably on the jack-shaft, for freewheel coasting and ease of pedaling when the motor is not running.

It can be seen from the description of the prior art and the above summary of the present invention, how this unique, new concept of a simple, multi-speed drive, which is rotated at a speed that creates the least amount of friction loss for both the pedal power up-speed and the motor power reduction, overcomes the efficiency limitations of the prior art. For the first time, a practical, efficient regenerative charging system for an electric bicycle can be accomplished due to this new technology. The present invention also has the advantage of being able to be fitted into an existing bicycle design, just above the pedal shaft, where it does not prevent the battery module from being mounted low (close to the ground) on the frame.

DETAILED DESCRIPTION OF THE INVENTION

Figure 1:
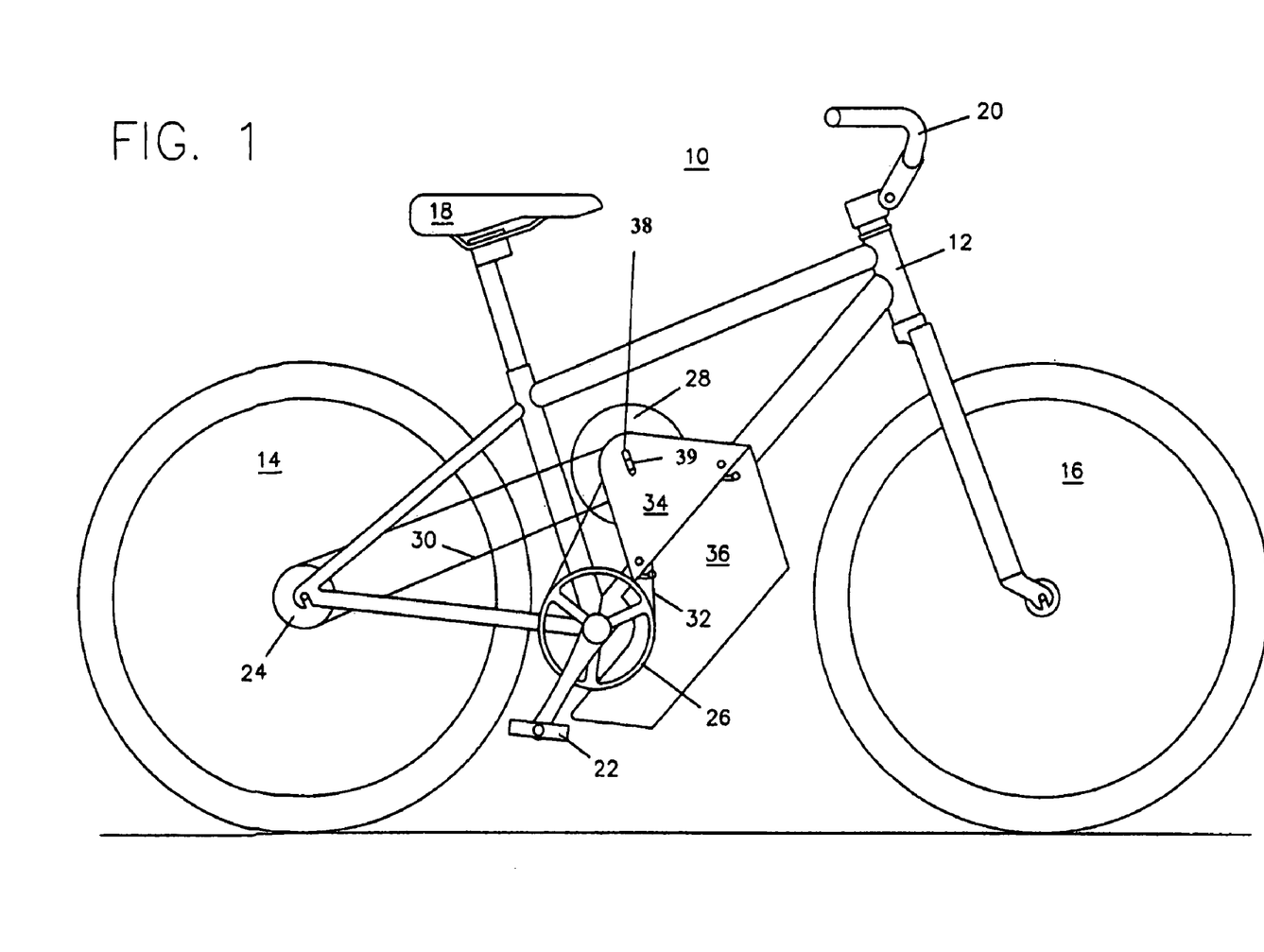
FIG. 1 is an illustration of a bicycle, exemplifying a first preferred embodiment of the present invention viewed from the right side.

Referring to FIG. 1, an electric powered bicycle 10 of the present invention preferably includes a frame and fork assembly 12, a front wheel assembly 16, a rear wheel assembly 14, a seat assembly 18, a handle bar assembly 20, a front and rear brake assembly (not shown), a pedal crank assembly 22, a multi-speed rear hub assembly 24, a pedal sprocket 26, a hub motor assembly 28, a hub motor axle 39, a drive chain 30, a pedal chain 32, a motor support bracket 34, and a battery module 36. The battery module 36 is mounted to the frame 12 in a way that makes it easy to remove in the forward direction and easy to replace in the reverse direction. The battery module 36 fits between sprocket 26 and the left side of pedal crank assembly 22 at a position no lower (closer to the ground) than pedal 22 at its lowest position.

Motor 28 was designed as a bicycle hub motor and, therefore, the outer case turns while the axle 39 remains fixed. Bracket 34 is mounted to frame 12 and supports the flattened axle 39 of hub motor 28 in slots 38 on both sides of bracket 34. Motor assembly 28 can be adjusted in slots 38 and tightened into position by axle nuts (not shown) on hub motor axle 39 to adjust the tension on chain 32.

Figure 2:
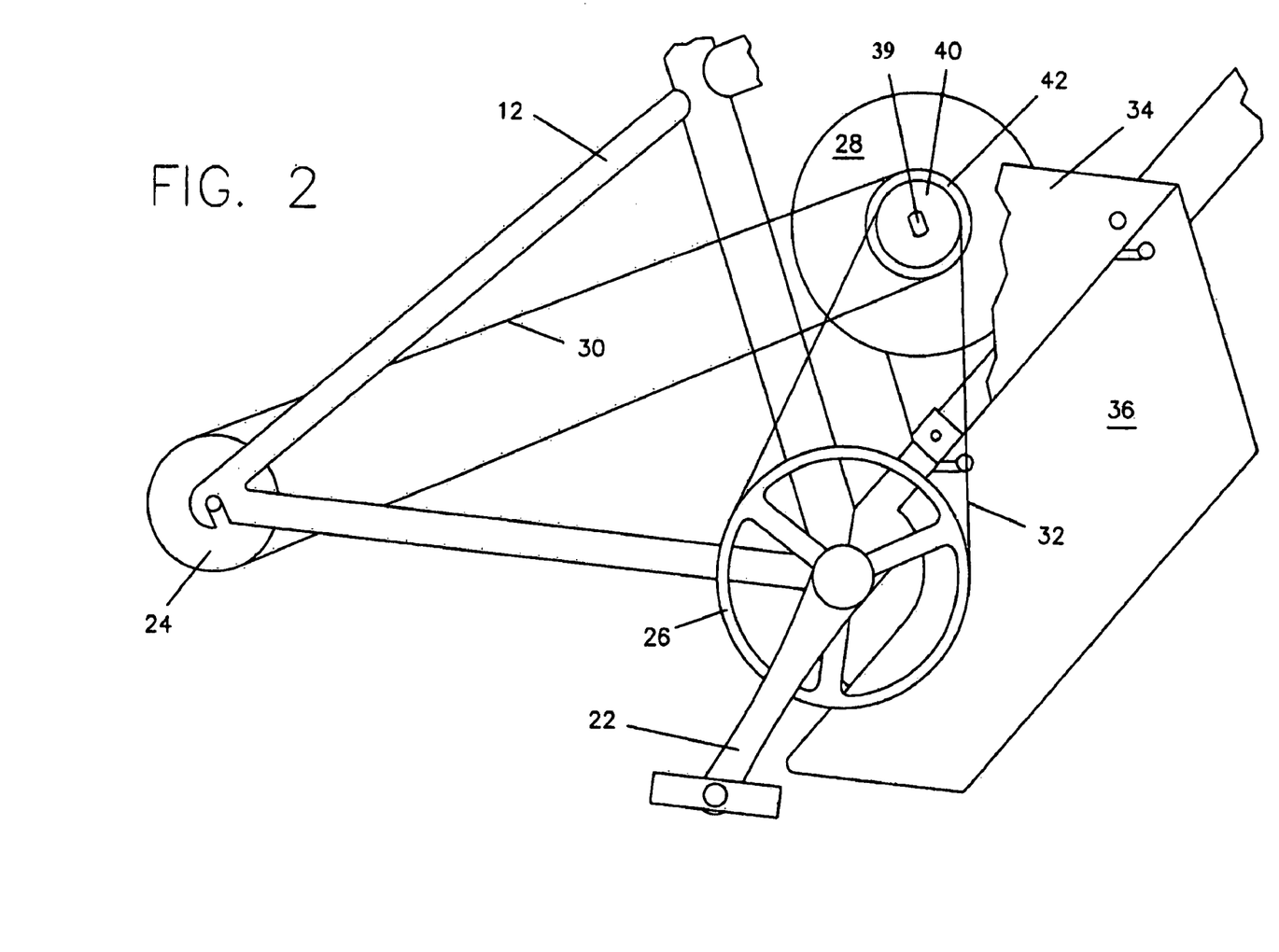
FIG. 2 is a view of the drive train of FIG. 1 with the bracket that holds the motor cut away so that the drive mechanism behind it is visible.

FIG. 2 is a view of the drive train in FIG. 1 with the bracket 34 cut away so that the pedal freewheel 40 and the drive sprocket 42 can be seen. Drive sprocket 42 is fixedly and concentrically mounted to the outer case of motor 28, and chain 30 is engaged to sprocket 42 and the conventional sprocket on the multi-speed hub 24, so that when the motor turns, it drives wheel 14. Freewheel 40 is mounted in its conventional position on the case of motor 28 and has the same function in this application as it does when the motor 28 is used as a bicycle wheel motor. When the motor 28 is operating, it does not turn the sprocket on the freewheel 40 or the pedal sprocket 26, but when the pedals are also operating and the sprocket on the freewheel 40 is rotated as fast as the motor 28, the pedals can drive the motor, and consequently, the bicycle.

Figure 3:
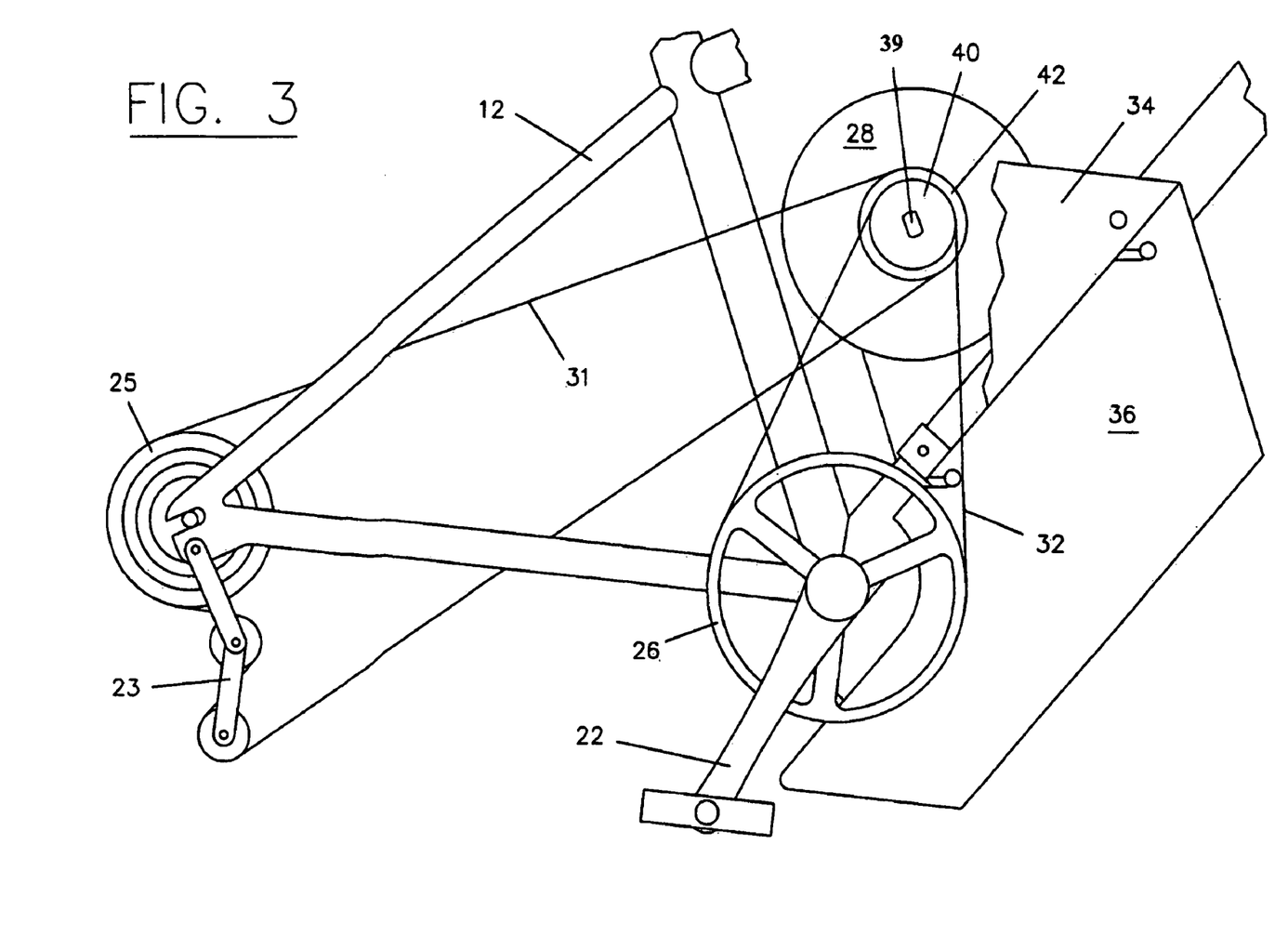
FIG. 3 is a view of a drive train of a second preferred embodiment of the present invention, utilizing a derailleur mechanism on the rear hub instead of a multi-speed hub with internal gears, like FIG. 1 and FIG. 2.

FIG. 3 is a view of a drive train of a second preferred embodiment of the present invention, utilizing a derailleur mechanism on the rear hub instead of a multi-speed hub with internal gears, like FIG. 1 and FIG. 2. The mechanism in FIG. 3 is the same as the mechanism in FIG. 1 and FIG. 2 except that chain 31 engages sprocket 42 on motor 28 and one of the sprockets on the freewheel, sprocket cluster 25, on the rear hub (not shown), depending on the position of the conventional bicycle derailleur 23. Thereby a multi-speed function similar to the hub in FIG. 1 and FIG. 2 is provided.

Figure 4:
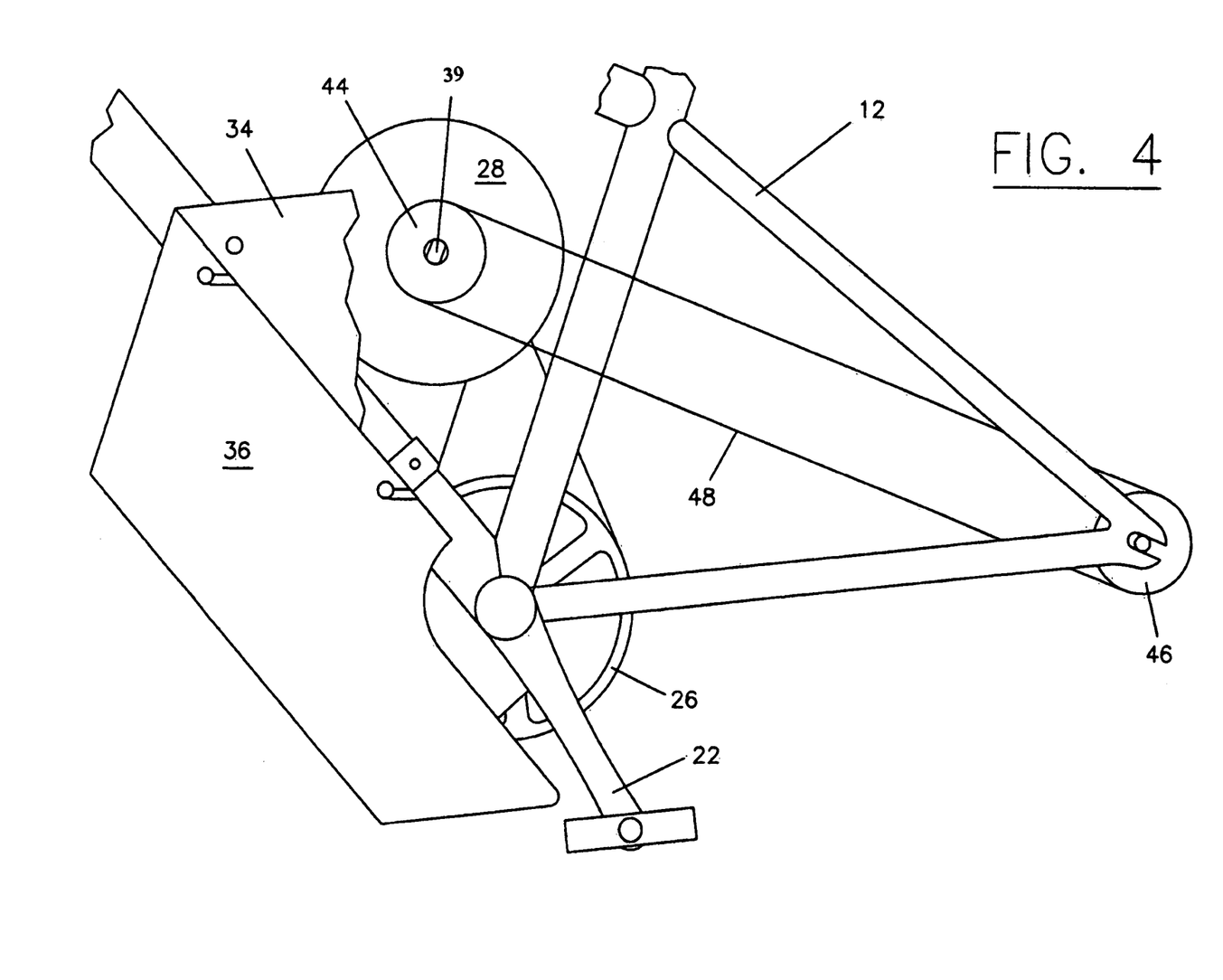
FIG. 4 is a view of the drive train of either FIG. 1 or FIG. 2 as viewed from the left side of the bicycle, illustrating the regenerative braking mechanism.

Referring to FIG. 4, FIG. 4 is a view of the drive train in either FIG. 3 or FIG. 1 and FIG. 2, but from the opposite (left) side of the bicycle, illustrating the drive train mechanism used to provide downhill, regenerative braking capability. Driven sprocket 44 is fixedly mounted to the case of motor 28 in the same manner as sprocket 42, except on the left side of the motor 28 instead of the right side, and chain 48 is operably engaged with sprocket 44 and the sprocket on freewheel 46. Freewheel 46 is fixedly and concentrically mounted to the left side of the rear hub of the bicycle in the direction that allows the motor 28 to run and turn the sprocket on the freewheel 46 without engaging the hub and turning the rear wheel 14. Therefore, when the motor is running or the bicycle is being pedaled, or both, the mechanism on the right side will be driving the rear wheel 14 through the multi-speed device, the most desirable method. However, when the bicycle is coasting (i.e., the motor is not driving the rear wheel) the rear wheel 14 is driving the motor 28, which, with enough speed and the correct electrical circuits engaged, can recharge the battery. The ratio between the numbers of teeth on the two sprockets, 44 and 46, must be determined by the ratio of the speed of the motor 28 to the speed of the hub 24 in its highest gear. When the motor is driving the multi-speed device, hub 24 or sprocket cluster 25, in its highest gear, the sprocket on freewheel 46 should drive sprocket 44, at preferably the same speed as the motor 28, or slightly slower; but not any faster, or the drive will malfunction.

Figure 5:
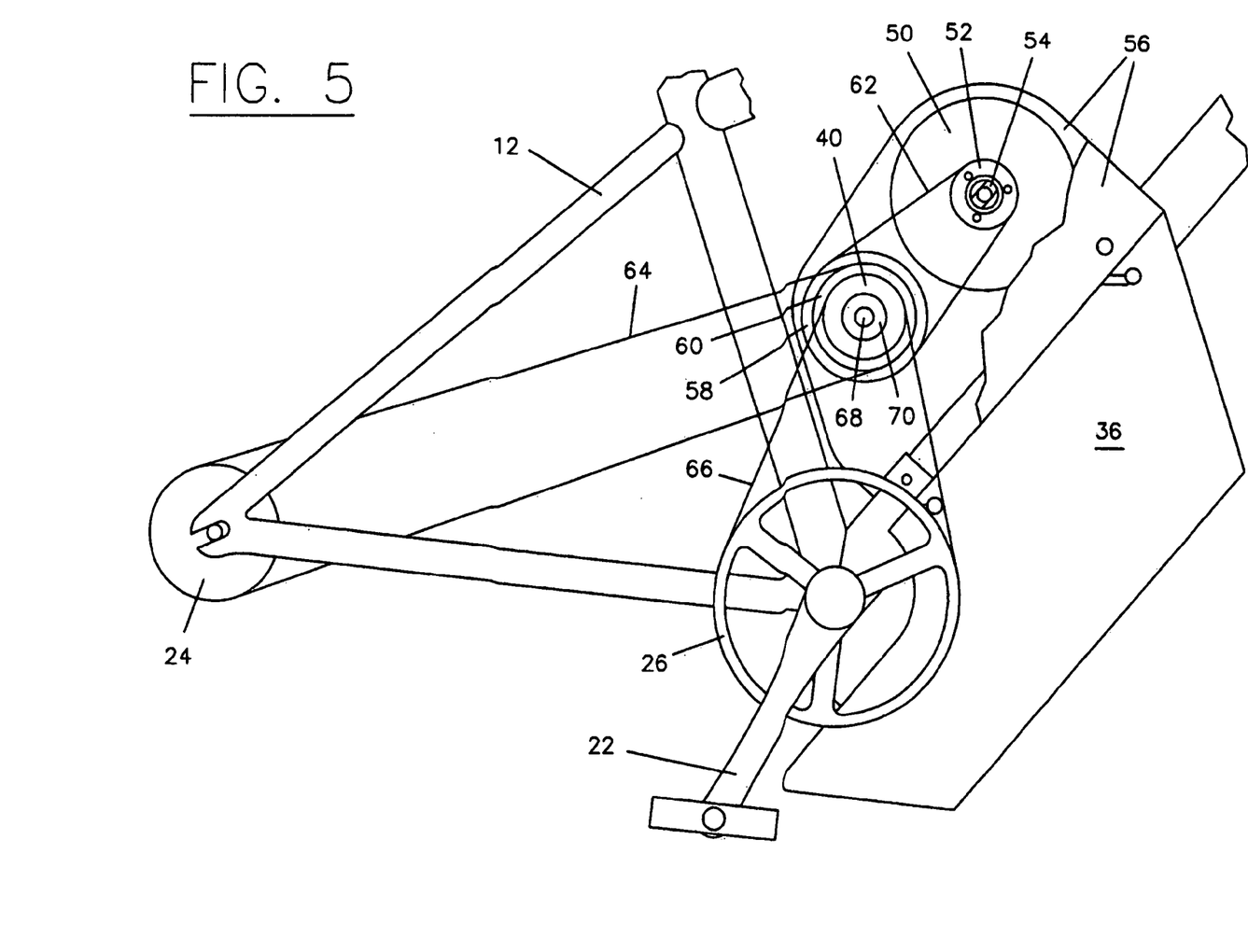
FIG. 5 is an illustration of the drive train of a third preferred embodiment of the present invention with a higher speed motor driving through a jack-shaft to approximate the pedal speed.

FIG. 5 is an illustration of the drive train of a third preferred embodiment of the present invention with a slightly higher speed motor driving through a belt and pulleys, chain and pulleys, gears, or the like, to a jack-shaft to provide a speed reduction drive mechanism to approximate the pedal speed. In this embodiment of the present invention a rotatable jack-shaft 68 takes the place of motor 28 in FIGS. 1 through 4. Bearings 70 are rotatably mounted to each end of the jack-shaft 68, and the outer races of bearings 70 are fixedly mounted to each side of motor bracket 56, leaving space for multiple sprockets and freewheel 40. In FIG. 5, bracket 56 is cut away so that the pedal freewheel 40 and sprockets 52, 58, and 60 can be seen. Drive sprocket 52 is fixedly and concentrically mounted to the outer case of motor 50, and chain 62 is operably engaged with sprocket 52 and sprocket 58, which is fixedly and concentrically mounted on shaft 68. Chain 64 is operably engaged with sprocket 60 (which is fixedly and concentrically mounted on shaft 68) and the conventional sprocket on the multi-speed hub 24, so that when the motor turns, it drives wheel 14 through chains 62 and 64. Chain 66 is operably engaged with the sprocket on freewheel 40 and the large sprocket 26 on the crank 22. Freewheel 40 is mounted on shaft 68 in the orientation so that when the motor 50 is operating, it does not turn the sprocket on the freewheel 40 nor the pedal sprocket 26. However, when the pedals 22 are also operating and freewheel 40 is rotating as fast as sprocket 58, which is being driven by the motor 50, the pedals 22 can drive the motor 50, the shaft 68, and consequently, the rear wheel of the bicycle.

Figure 6:
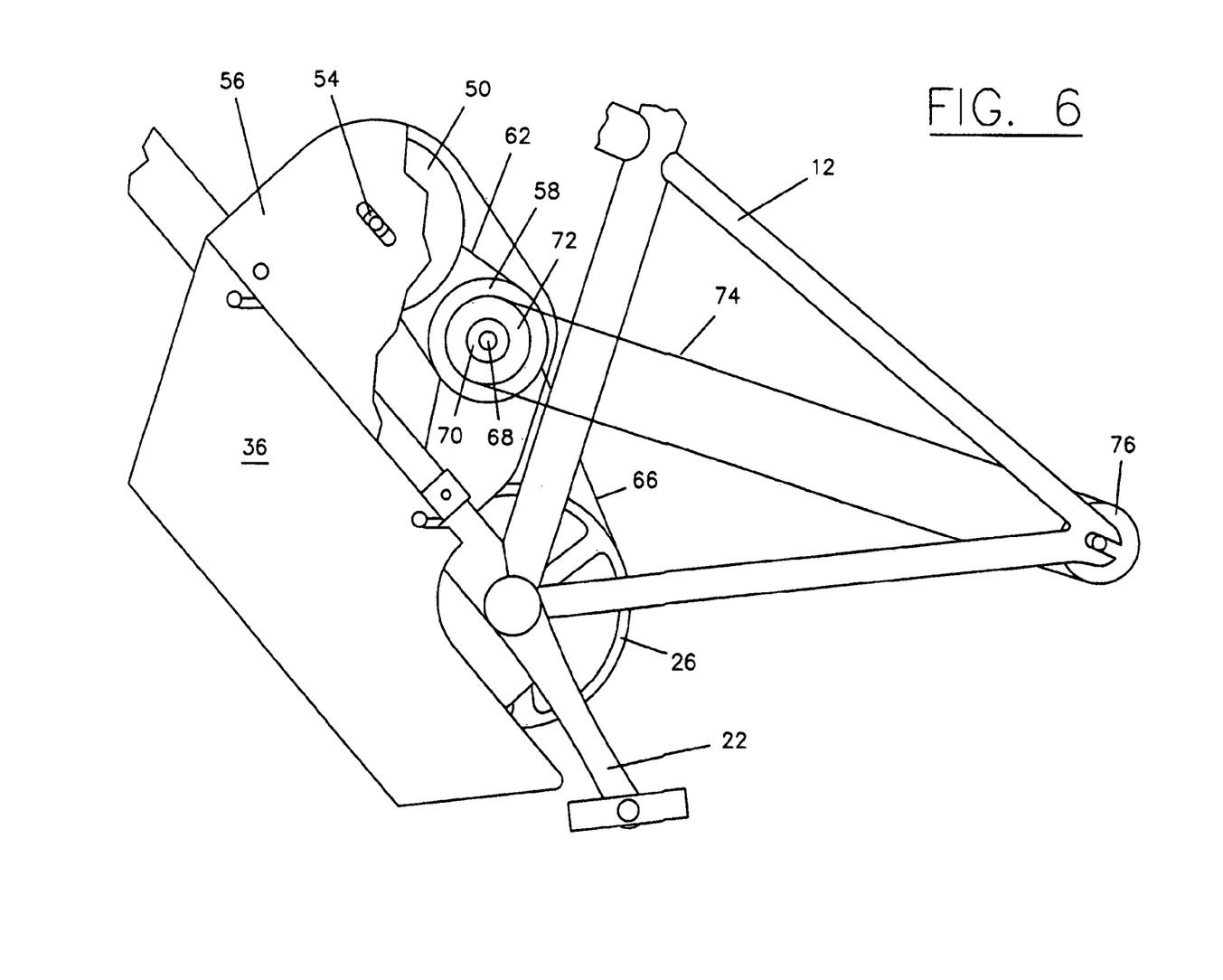
FIG. 6 is a view of the drive train of FIG. 5 from the left side of the bicycle, also illustrating the regenerative braking mechanism.

FIG. 6 is a view of the drive train of FIG. 5 from the left side of the bicycle, similar to FIG. 4, illustrating the drive train mechanism used to provide downhill, regenerative braking capability for this embodiment. The mechanism illustrated here is the same as in FIG. 4, except that sprocket 72 (which has the same function as sprocket 44) is concentrically and fixedly mounted to shaft 68 instead of the housing of motor 28. Since the motor 50 is directly connected to the shaft 68 through chain 62 and sprockets 52 and 58, this drive train functions the same as the drive train in FIG. 4 and provides the same downhill, regenerative braking capability under the same conditions.

Figure 7:
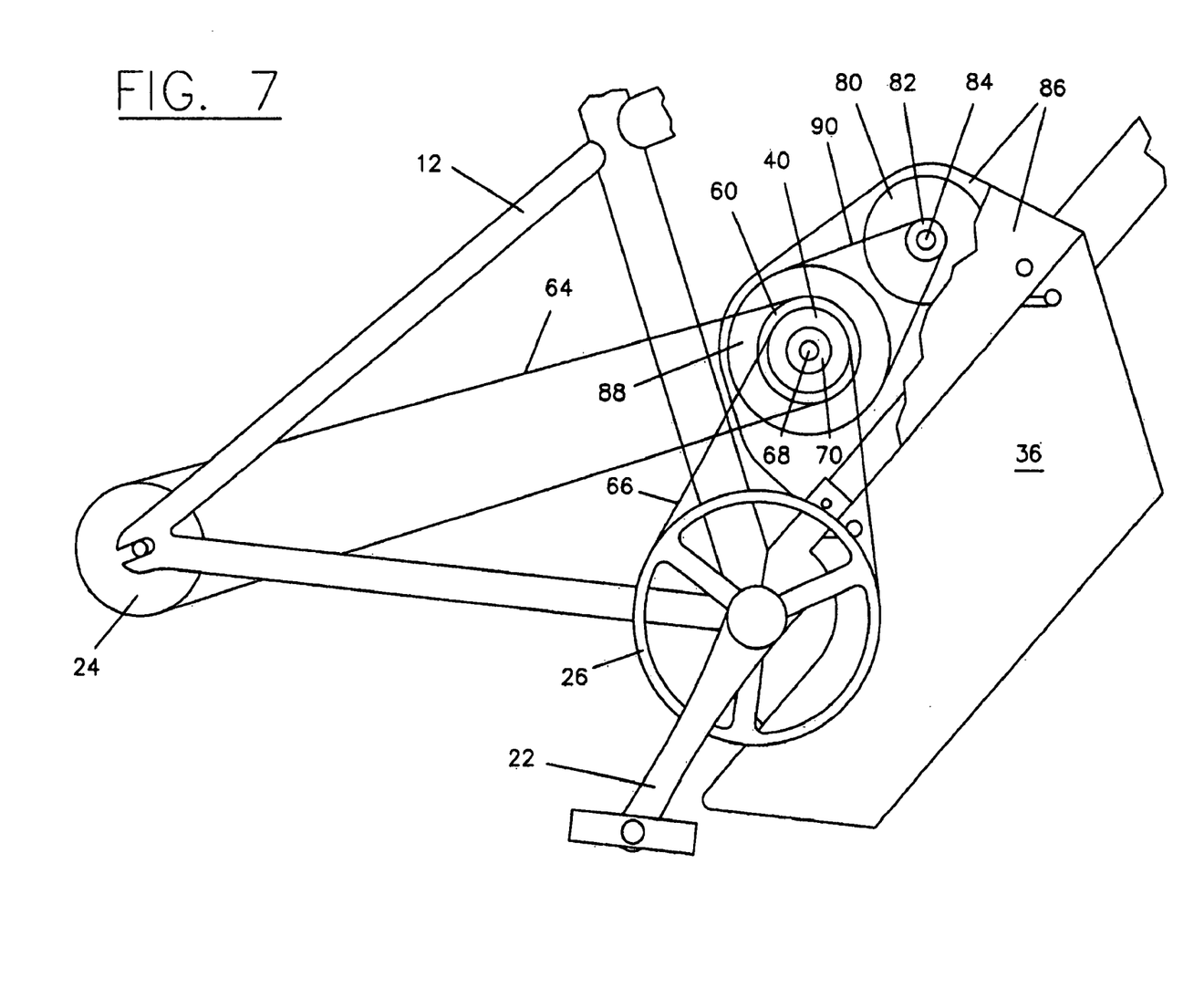
FIG. 7 is an illustration of the drive train of a fourth preferred embodiment of the present invention with a smaller, higher speed motor driving through a jack-shaft for further speed reduction and to approximate the pedal speed with the motor speed.

FIG. 7 is an illustration of the drive train of a fourth preferred embodiment of the present invention with a smaller, much higher speed motor driving through a belt and pulleys, chain and pulleys, gears, or the like, to a jack-shaft to provide a speed reduction drive mechanism for two purposes: one, for further speed reduction before driving the rear wheel; and two, like the mechanism in FIG. 5, to approximate the pedal speed with the motor speed. The mechanism illustrated here is the same as in FIG. 5, except that pedaling the bicycle forward does not turn the motor 80. The large freewheel sprocket 88, which replaces sprocket 58 in FIG. 5, is mounted on jack-shaft 68 in the orientation that allows shaft 68 to turn from pedaling without turning the sprocket on the freewheel 88, but does not allow the motor 80 to turn sprocket 88 without turning the shaft 68. This arrangement thereby allows the motor 80 to drive the rear wheel, but not allowing the pedals to turn the motor 80. There is so much friction in the large speed reduction drive required (about twenty to one) when using a small, high-speed motor in an electric bicycle, that the bicycle would not pedal freely if the motor had to be turned. Therefore, this embodiment does not provide downhill regenerative pedaling or braking, but the cost of a small, high speed motor is much less than the motor in FIG. 2.

The present invention encompasses an apparatus and method for a pedal and electric powered vehicle, including a pedal crank and sprocket, an electric motor, a sprocket and a freewheel mounted to the drive portion of the motor, a chain connecting the motor sprocket to a sprocket on the wheel, and a chain connecting the freewheel to the pedal sprocket, so that either the motor or the pedals, independently or in unison, can drive the vehicle.

The present invention also encompasses an apparatus and method for a pedal and electric powered vehicle having another freewheel mounted to either the wheel hub or the drive portion of the motor, another sprocket mounted to the other of the wheel hub or the drive portion of the motor, and another chain connecting the sprocket to the freewheel so that the wheel can drive the motor for regenerative braking.

While the present invention has been illustrated by a description of the preferred embodiments and while these embodiments have been described in considerable detail in order to describe the best mode of practicing the invention, it is not the intention of the applicant to restrict or in any way limit the scope of the appended claims to such detail. For example, if mounted in the correct orientations, freewheel 46 and sprocket 44 in FIG. 4 could be interchanged and still provide the same downhill, regenerative braking capability.

Also, the motor housing and battery box could be formed as part of the structural members of a specially designed bicycle frame, with the present invention in mind. Additional advantages and modifications within the spirit and scope of the invention will readily appear to those skilled in the art. The invention itself should only be defined by the appended claims.

What is claimed is:

1. An electric drive vehicle comprising:
a frame;
a wheel, having a wheel hub with at least one hub sprocket, said wheel rotatably mounted in said frame;
an electric motor, having a rotatable assembly and a fixed assembly, said fixed assembly attached to said frame;
a motor sprocket rotationally fixed to said rotatable assembly of said motor, wherein the motor sprocket rotates with a same angular velocity at all times as the rotatable assembly in both a clockwise direction and in a counter clockwise direction during all operation of the electric drive vehicle;
a drive chain connecting said motor sprocket and said at least one hub sprocket for transferring rotary motion from said motor sprocket to said at least one hub sprocket;
a pedal crank assembly rotatably mounted in said frame; and
a uni-directional drive connecting said motor sprocket and said pedal crank assembly for transferring rotary motion from said pedal crank assembly to said motor sprocket, but not from said motor sprocket to said pedal crank assembly,
whereby said vehicle can be driven either by said pedal crank assembly through said motor sprocket or by said motor alone without turning said pedal crank assembly, or by both said pedal crank assembly and said motor in unison.

2. The electric drive vehicle of claim 1, wherein said vehicle is a bicycle and wherein said hub is a multi-speed hub.

3. The electric drive bicycle of claim 2, wherein said multi-speed hub has internal gears that can be shifted.

4. The electric drive bicycle of claim 2, wherein said multi-speed hub has two or more sprockets on a freewheel, and a corresponding derailleur that can shift the drive chain to engage any of said sprockets.

5. The electric drive vehicle of claim 1, wherein said electric motor is slow speed and gearless, and wherein said motor is in electrical communication with an electrical power source, whereby said pedal crank assembly can efficiently drive said motor for recharging the electrical power source.

6. The electric drive vehicle of claim 1, wherein said electric motor is a hub motor.

7. The electric drive vehicle of claim 6, wherein said rotatable assembly is an outer case of the hub motor and the fixed assembly is a hub motor axle of the hub motor.

8. The electric drive vehicle of claim 7, wherein said motor sprocket is attached to said outer case.

9. The electric drive vehicle of claim 1, wherein said electric motor turns at approximately 260 RPM in a bicycle traveling at 20 miles per hour.

10. The electric drive vehicle of claim 1, wherein said electric motor is a gearless motor.

11. The electric drive vehicle of claim 1, wherein said unidirectional drive comprises:
a freewheel connected to said rotatable assembly;
a drive sprocket attached to the freewheel, wherein a forward rotation is transmittable from the drive sprocket to the rotatable assembly but not from the rotatable assembly to the drive sprocket;
a pedal sprocket attached to the pedal crank assembly; and
a pedal chain connecting the pedal sprocket to the drive sprocket.

12. The electric drive vehicle of claim 1, wherein said unidirectional drive comprises:
a drive sprocket uni-directionally connected to said rotatable assembly, wherein a forward rotation is transmittable from the drive sprocket to the rotatable assembly but not from the rotatable assembly to the drive sprocket;
a pedal sprocket attached to the pedal crank assembly; and
a pedal chain connecting the pedal sprocket to the drive sprocket.

13. The electric drive vehicle of claim 12, wherein said electric motor is mounted to the frame using slots to allow adjustment of tension of the pedal chain.

14. The electric drive vehicle of claim 1, wherein said motor sprocket is approximately the same size as said at least one hub sprocket.

15. The electric drive vehicle of claim 1, further including:
a hub freewheel rotationally connected to said wheel hub;
a second hub sprocket attached to the hub freewheel, wherein a forward rotation is transmittable from the hub to the second hub sprocket but not from the second hub sprocket to the hub;
a second motor sprocket rotationally fixed to said rotatable assembly of said motor; and
a regenerating chain connecting the second hub sprocket and the second motor sprocket,
whereby a power supply may be recharged.

16. The electric drive vehicle of claim 1, further including:
a second hub sprocket uni-directionally connected to the wheel hub, wherein a forward rotation is transmittable from the hub to the second hub sprocket but not from the second hub sprocket to the hub;
a second motor sprocket rotationally fixed to said rotatable assembly of said motor; and
a regenerating chain connecting the second hub sprocket and the second motor sprocket,
whereby a power supply may be recharged.

17. An electric drive vehicle comprising:
a frame;
a wheel, having a hub with at least one hub sprocket, said wheel rotatably mounted in said frame;
a hub motor comprising a motor axle and an outer case, said motor axle fixedly attached to said frame;
a motor sprocket rotationally fixed to said outer case;
a drive chain connecting said motor sprocket and said at least one hub sprocket for transferring rotary motion from said motor sprocket to said at least one hub sprocket;
a pedal crank assembly rotatably mounted in said frame; and
a uni-directional drive connecting said motor sprocket and said pedal crank assembly for transferring rotary motion from said pedal crank assembly to said motor sprocket, but not from said motor sprocket to said pedal crank assembly,
whereby said vehicle can be driven either by said pedal crank assembly though said motor sprocket or by said motor alone without turning said pedal crank assembly, or by both said pedal crank assembly and said motor in unison.

18. An electric drive vehicle comprising:
a frame;
a wheel, having a multi-speed hub with at least one hub sprocket, said wheel rotatably mounted in said frame and said at least one hub sprocket connected to said wheel through a hub freewheel wherein forward rotational motion is transmittable from said at least one hub sprocket to said wheel, but not from said wheel to said at least one hub sprocket;
an electric motor, having a rotatable assembly and a fixed assembly, said fixed assembly attached to said frame;
a motor sprocket rotationally fixed to said rotatable assembly of said motor, wherein the motor sprocket rotates with a same angular velocity at all times as the rotatable assembly in both a clockwise direction and in a counter clockwise direction during all operation of the electric drive vehicle;
a drive chain connecting said motor sprocket and said at least one hub sprocket for transferring rotary motion from said motor sprocket to said at least one hub sprocket;
a pedal crank assembly rotatably mounted in said frame;
a freewheel rotationally connected to said rotatable assembly;
a drive sprocket attached to the freewheel, wherein a forward rotation is transmittable from the drive sprocket to said rotatable assembly but not from said rotatable assembly to said drive sprocket;
a pedal sprocket attached to said pedal crank assembly; and
a pedal chain connecting the pedal sprocket to said drive sprocket,
whereby said vehicle can be driven either by said pedal crank assembly through said motor sprocket or by said motor alone without turning said pedal crank assembly, or by both said pedal crank assembly and said motor in unison.

19. An electric drive vehicle comprising:
a frame;
a wheel, having a hub with at least one hub sprocket, said wheel rotatably mounted in said frame;
an electric motor which turns at approximately 260 RPM in a bicycle traveling at 20 miles per hour, the electric motor comprising a motor axle and an outer case, said motor axle fixedly attached to said frame;
a motor sprocket attached to said outer case;
a drive chain connecting said motor sprocket and a said at least one hub sprocket for transferring rotary motion from said motor sprocket to said at least one hub sprocket;
a pedal crank assembly rotatably mounted in said frame;
a drive sprocket uni-directionally connected to the outer case, wherein a forward rotation is transmittable from the drive sprocket to said outer case but not from said outer case to said drive sprocket;
a pedal sprocket attached to said pedal crank assembly; and
a pedal chain connecting the pedal sprocket to said drive sprocket, whereby said vehicle can be driven either by said pedal crank assembly through said motor sprocket or by said motor alone without turning said pedal crank assembly, or by both said pedal crank assembly and said motor in unison.

20. An electric drive vehicle comprising:

a frame;

a wheel, having a wheel hub with at least one hub sprocket, said wheel rotatably mounted in said frame;

a hub motor comprising a motor axle and an outer case, said motor axle fixedly attached to said frame;

a motor sprocket rotationally fixed to said outer case;

a drive chain connecting said motor sprocket and said at least one hub sprocket for transferring rotary motion from said motor sprocket to said at least one hub sprocket;

a pedal crank assembly rotatably mounted in said frame;

a freewheel attached to said outer case;

a drive sprocket attached to the freewheel, wherein a forward rotation is transmittable from the drive sprocket to said motor sprocket but not from said motor sprocket to said drive sprocket;

a pedal sprocket attached to said pedal crank assembly; and a pedal chain connecting the pedal sprocket to said drive sprocket, whereby said vehicle can be driven either by said pedal crank assembly through said motor sprocket or by said motor alone without turning said pedal crank assembly, or by both said pedal crank assembly and said motor in unison.

* * * * *